US012672137B2

(12) United States Patent
Liu et al.

(10) Patent No.: US 12,672,137 B2
(45) Date of Patent: Jun. 30, 2026

(54) PDSCH TRANSMISSION METHOD AND APPARATUS, DEVICE, AND STORAGE MEDIUM

(71) Applicant: VIVO MOBILE COMMUNICATION CO., LTD., Dongguan (CN)

(72) Inventors: Hao Liu, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 292 days.

(21) Appl. No.: 18/137,515

(22) Filed: Apr. 21, 2023

(65) Prior Publication Data

US 2023/0262701 A1 Aug. 17, 2023

Related U.S. Application Data

(63) Continuation of application No. PCT/CN2021/125752, filed on Oct. 22, 2021.

(30) Foreign Application Priority Data

Oct. 23, 2020 (CN) .......................... 202011149238.2

(51) Int. Cl.
*H04W 72/1273* (2023.01)
*H04L 5/00* (2006.01)
*H04W 72/232* (2023.01)

(52) U.S. Cl.
CPC ....... *H04W 72/1273* (2013.01); *H04L 5/0051* (2013.01); *H04W 72/232* (2023.01)

(58) Field of Classification Search
CPC ... H04L 5/0007; H04L 5/0044; H04L 5/0051; H04L 5/0053; H04L 5/0092; H04W 72/1273; H04W 72/232; H04W 72/23
See application file for complete search history.

(56) References Cited

U.S. PATENT DOCUMENTS

| | | | | |
|---|---|---|---|---|
| 11,212,825 B2 | | 12/2021 | Gong et al. | |
| 11,799,589 B2 | * | 10/2023 | Liu | ......................... H04W 72/23 |
| 2019/0222400 A1 | * | 7/2019 | Bagheri | ................ H04L 5/0082 |
| 2020/0053757 A1 | * | 2/2020 | Bagheri | ................... H04L 5/10 |
| 2020/0100223 A1 | * | 3/2020 | Park | ........................... H04L 5/10 |
| 2020/0154467 A1 | * | 5/2020 | Gong | .................... H04L 5/0055 |
| 2021/0409173 A1 | * | 12/2021 | Chatterjee | ............. H04L 5/0051 |
| 2022/0039140 A1 | * | 2/2022 | Yi | .............................. H04L 1/08 |
| 2023/0413287 A1 | * | 12/2023 | Matsumura | ............... H04L 1/08 |

FOREIGN PATENT DOCUMENTS

| | | |
|---|---|---|
| CN | 110731112 A | 1/2020 |
| WO | 2020064512 A1 | 4/2020 |

OTHER PUBLICATIONS

ZTE et al., "Discussion on PDCCH repetition for URLLC", 3 GPP TSG RAN WG1 Meeting #92bis, R1-1803802, Apr. 16-20, 2018, Sanya, China.

* cited by examiner

*Primary Examiner* — Rasheed Gidado
(74) *Attorney, Agent, or Firm* — The Webb Law Firm

(57) ABSTRACT
A PDSCH transmission method includes: in a case that transmission of a PDCCH occupies one or more transmission occasions for repetition sending, transmitting a PDSCH based on related configuration information of the PDCCH.

20 Claims, 5 Drawing Sheets

Start

In a case that transmission of a physical downlink control channel PDCCH occupies one or more transmission occasions for repetition sending, transmit a PDSCH based on related configuration information of the PDCCH

200

End

Network side device 11                    11

Terminal

Terminal

Start

In a case that transmission of a physical downlink control channel PDCCH occupies one or more transmission occasions for repetition sending, transmit a PDSCH based on related configuration information of the PDCCH          200

End

PDSCH TRANSMISSION METHOD AND APPARATUS, DEVICE, AND STORAGE MEDIUM

CROSS-REFERENCE TO RELATED APPLICATIONS

This application is a Bypass Continuation Application of PCT/CN2021/125752 filed Oct. 22, 2021, and claims priority to Chinese Patent Application No. 202011149238.2 filed Oct. 23, 2020, the disclosures of which are hereby incorporated by reference in their entireties.

BACKGROUND OF THE INVENTION

Field of the Invention

This application pertains to the field of communications technologies, and specifically relates to a PDSCH transmission method and apparatus, a device, and a storage medium.

Description of Related Art

Transmission of a PDCCH (Physical Downlink Control Channel) is closely related to transmission of a PDSCH (Physical Downlink Shared Channel).

In a case that reliability transmission is enhanced for a PDCCH, for example, when the PDCCH is repeatedly sent in different CORESETs or different transmission occasions, transmission of a PDSCH scheduled by the PDCCH may fail.

Therefore, there is an urgent need for a PDSCH transmission method that adapts to a case that reliability transmission is enhanced for a PDCCH.

SUMMARY OF THE INVENTION

According to a first aspect, a PDSCH transmission method is provided, where the method is applied to a communications device and includes:

in a case that transmission of a physical downlink control channel PDCCH occupies one or more transmission occasions for repetition sending, transmitting a PDSCH based on related configuration information of the PDCCH.

According to a second aspect, a PDSCH transmission apparatus is provided, including:

a transmission module, configured to: in a case that transmission of a physical downlink control channel PDCCH occupies one or more transmission occasions for repetition sending, transmit a PDSCH based on related configuration information of the PDCCH.

According to a third aspect, a communications device is provided. The communications device includes a processor, a memory, and a program or an instruction that is stored in the memory and executable on the processor, where the program or the instruction is executed by the processor to implement the steps of the method in the first aspect.

According to a fourth aspect, a non-transitory readable storage medium is provided. The non-transitory readable storage medium stores a program or an instruction, and the program or the instruction is executed by a processor to implement the steps of the method in the first aspect.

According to a fifth aspect, a chip is provided. The chip includes a processor and a communications interface, the communications interface is coupled to the processor, and the processor is configured to run a program or an instruction of a communications device to implement the method in the first aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a 6th generation (6G) communications system.

Figure 1:
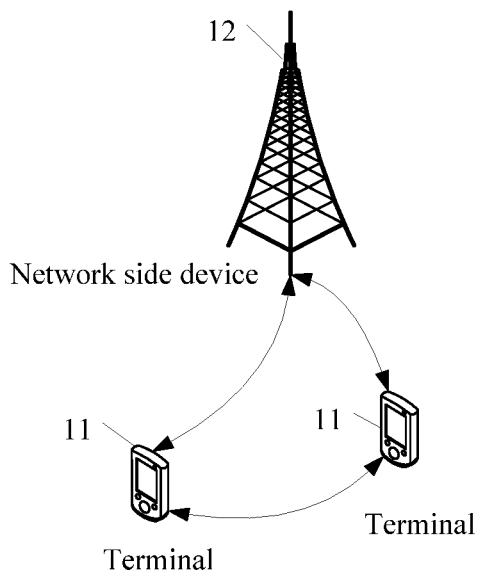
FIG. 1 is a block diagram of a wireless communications system according to an embodiment of this application.

FIG. 1 is a block diagram of a wireless communications system according to an embodiment of this application. The wireless communications system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, a PDSCH transmission method and apparatus provided in the embodiments of this application are described in detail by using some exemplary embodiments and application scenarios.

Figure 2:
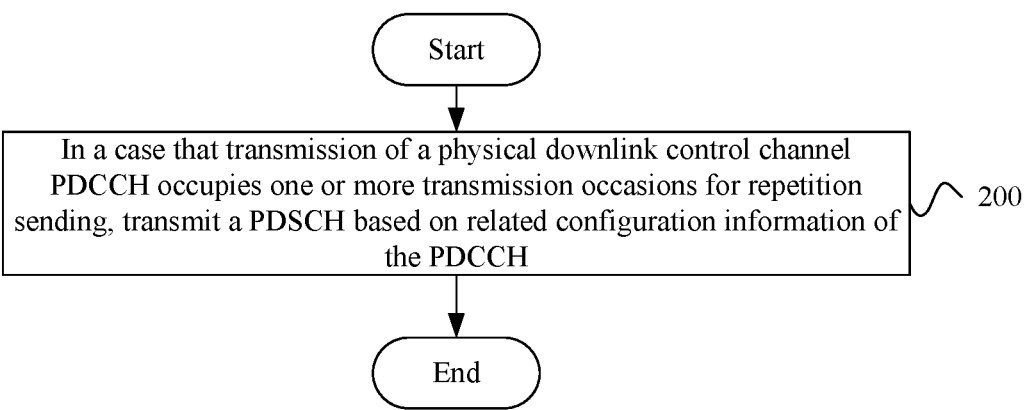
FIG. 2 is a schematic flowchart of a PDSCH transmission method according to an embodiment of this application.

FIG. 2 is a schematic flowchart of a PDSCH transmission method according to an embodiment of this application. As shown in FIG. 2, the method includes the following steps.

Step 200: In a case that transmission of a physical downlink control channel PDCCH occupies one or more transmission occasions for repetition sending, transmit a PDSCH based on related configuration information of the PDCCH.

Transmission of the PDCCH is closely related to transmission of the PDSCH. For example, a time-frequency resource start location of the PDSCH scheduled by DCI format 1_0 needs to refer to a CORESET (Control Resource Set) in which DCI (Downlink Control Information) is located. When the PDCCH collides with, that is, overlaps with, the PDSCH on time-frequency resources, rate matching needs to be performed on the PDSCH. When a DMRS (Demodulation Reference Signal) pilot of the PDSCH collides with the CORESET on the time-frequency resources, the DMRS symbol needs to be shifted backward. In addition, a gap restriction needs to be maintained between the PDCCH and the scheduled PDSCH in time domain.

However, when reliability transmission is enhanced for the PDCCH, for example, when the PDCCH is repeatedly sent on different CORESETs or different monitoring occasions, an existing PDSCH scheduling method is not applicable. Therefore, a transmission location of the physical downlink shared channel PDSCH may be flexibly determined based on the different related configuration information of the PDCCH, and the PDSCH may be transmitted.

It can be understood that a monitoring occasion in this embodiment is relative to a terminal, and correspondingly, may be described as a transmission occasion relative to a network side.

It can be understood that, in this embodiment, the communications device may be a network side device. When the communications device is a network side device, the PDSCH may be sent based on the related configuration information of the PDCCH in a case that transmission of the PDCCH occupies one or more transmission occasions for repetition sending.

It can be understood that, in this embodiment, the communications device may be a terminal device. When the communications device is a terminal device, the PDSCH may be received based on the related configuration information of the PDCCH in a case that transmission of the PDCCH occupies one or more transmission occasions for repetition sending.

In this embodiment of this application, in a case that transmission of a physical downlink control channel PDCCH occupies one or more transmission occasions for repetition sending, a transmission location of a PDSCH is determined by using different methods based on different related configuration information of the PDCCH, and then the PDSCH is scheduled and transmitted, to better adapt to a case that reliability transmission is enhanced for the PDCCH, thereby ensuring successful scheduling and transmission of the PDSCH.

Optionally, before the transmitting a PDSCH based on related configuration information of the PDCCH, the method further includes:

in a case that the PDCCH is configured to be associated with control resource sets CORESETs of a plurality of different CORESET IDs, determining that a resource block RB start index of the PDSCH is associated with a location of a lowest RB in a specified CORESET in the different CORESETs; or in a case that the PDCCH is configured to be associated with only a CORESET of one CORESET ID, determining that an RB start index of the PDSCH is associated with a location of a lowest RB in the CORESET of the one CORESET ID, where the PDSCH is scheduled by a downlink control information DCI format of any common search space type.

In an NR system, UE needs to know a location of the PDCCH in frequency domain and a location of the PDCCH in time domain to successfully decode the PDCCH. Therefore, in the NR system, information such as a frequency band occupied by the PDCCH in frequency domain and the number of OFDM symbols occupied by the PDCCH in time domain is encapsulated into a CORESET, and information such as a start OFDM symbol number of the PDCCH and a PDCCH monitoring cycle is encapsulated into a search space. A possible location of the PDCCH may be determined by using the CORESET and the search space.

The PDCCH is a downlink control channel, and is mainly used to carry uplink scheduling information and downlink scheduling information. Control information carried on the PDCCH is referred to as DCI (Downlink control information). Because there are many functions of the DCI, the DCI is generally classified into different types for convenience of distinguishing. In 5G NR, the PDCCH is mainly responsible for transmitting various key control information of a physical layer, including frequency domain scheduling information of the PDSCH.

Frequency domain allocation manners of the PDSCH are divided into two types: Type0 and Type1. Type0 represents discontinuous RB scheduling, and Type1 represents continuous RB scheduling. For Type0, a partial frequency diversity gain may be obtained because allocation of frequency domain resources are discrete. For Type1, a frequency domain scheduling resource may be represented by using an RB start index and the number of scheduled RBs. Therefore, data bit transmission overheads in the PDCCH can be reduced.

For example, Type0 or Type1 scheduling is configured by using a higher-layer parameter resource Allocation in a PDSCH-Config parameter set, where resourceAllocation-Type0 represents Type0 scheduling, resourceAllocation-Type1 represents Type1 scheduling, and dynamicSwitch represents dynamic scheduling. For example, a scheduling type may be indicated by a 1-bit field in the DCI is Type0 or Type1.

It should be noted that when the PDSCH is scheduled by using DCI 1-0, a frequency domain resource scheduling type can only be configured as Type1, thereby reducing DCI bit overheads of the PDCCH.

For example, a search space parameter set includes a parameter searchSpaceType, which is used to indicate a search space type and a scheduled DCI Format. The search space type includes a CSS (Common Search Space) or a USS (UE Specific Search Space), and the DCI Format includes 0-0, 0-1, 1-0, 1-1, 2-0, 2-1, 2-2, and 2-3.

Generally, when the PDSCH is scheduled by DCI format 1_0 of any common search space type, an RB number start location of the PDSCH is a location of a lowest RB index of a CORESET in which the DCI format 1_0 is located, regardless of the PDSCH is located is in which activated bandwidth part (BWP), rather than a location of a lowest RB index of a reference BWP.

In this embodiment, in a case that reliability transmission is enhanced for the PDCCH, different CORESET IDs are associated with the PDCCH. To successfully transmit the PDSCH, a lowest RB index corresponding to a CORESET ID to be associated with an RB index of the scheduled PDSCH may be directly specified.

For example, based on related configuration information of a PDCCH, it may be determined that repetition sending is performed on the PDCCH. Different repetition occasions are associated with different search spaces, and the different search spaces are associated with different CORESET IDs. It may be considered that the PDCCH is associated with the different CORESET IDs. Therefore, the lowest RB index corresponding to the CORESET ID to be associated with the RB index of the scheduled PDSCH may be directly specified.

Therefore, when the PDSCH is scheduled by PDCCH DCI format1_0, and the PDCCH may be of any common search space type, if a network configures that the CSS is associated with a plurality of CORESETs, and different CORESETs are configured with different CORESET IDs, the RB number start location of the PDSCH may be specified in advance.

For example, it may be specified that the RB number start location of the PDSCH refers to a location of a lowest RB in a CORESET of a smallest CORESET ID in the plurality of CORESETs associated with the PDCCH.

For example, it may be specified that the RB number start location of the PDSCH refers to a location of a lowest RB in all associated CORESETs.

For example, to successfully transmit the PDSCH, the PDCCH may be further configured to be associated with only a CORESET of one CORESET ID, and the PDCCH may be of any CSS (common search space) type, that is, the CSS can be associated with only one CORESET ID. In this case, it may be determined that the RB start index of the PDSCH scheduled by the DCI format of the CSS is associated with the location of the lowest RB in the CORESET of the one CORESET ID.

Optionally, in a case that the PDCCH collides with a time-frequency resource of a PDSCH scheduled by the PDCCH, before the transmitting a PDSCH based on related configuration information of the PDCCH, the method further includes:

transmitting the PDSCH without occupying the time-frequency resource on which collision occurs, where the time-frequency resource is a time-frequency resource of all PDCCH transmission occasions on which collision occurs, and all the PDCCH transmission occasions on which collision occurs are determined by UE based on a preset rule and according to a PDCCH transmission occasion successfully detected by the UE; or in a case that one PDCCH transmission occasion collides with one PDSCH transmission occasion, and a TCI state activated by a CORESET associated with the PDCCH and a TCT state indicated by the PDSCH transmission occasion are not in a same group, transmitting the PDSCH on the time-frequency resource on which collision occurs.

Generally, if a time-frequency resource allocated to a PDSCH collides with, that is, overlaps with, a PDCCH that schedules the PDSCH, the time-frequency resource on which overlap occurs is not used to transmit the PDSCH.

In this embodiment, in a case that reliability transmission is enhanced for the PDCCH, the UE may successfully detect only some PDCCHs, so that the PDSCH can be received and detected. However, a time-frequency resource occupied by a PDCCH that is not successfully detected may also overlap with the PDSCH. Therefore, to successfully transmit the PDSCH, the time-frequency resource occupied by the PDCCH that is not successfully detected needs to be further determined.

Therefore, in this embodiment, based on the preset rule, all the PDCCH transmission occasions on which collision occurs may be determined according to the successfully detected PDCCH transmission occasion, and then all time-frequency resources on which collision occurs may be determined, that is, all the time-frequency resources on which collision occurs may not be occupied when the PDSCH is transmitted.

For example, when a PDCCH schedules transmission of a PDSCH, the PDCCH may include M (M≥1) candidate PDCCHs, that is, PDCCH candidates, and the PDSCH may include N (N≥1) PDSCH transmission occasions for transmitting a same TB block. If the UE identifies M1 (M≥M1≥1) PDCCH transmission candidates, and time-frequency resources occupied by the M1 PDCCHs and N1 (N≥N1≥1) PDSCH transmission occasions for transmitting a same TB block overlap, transmission of the PDSCH does not occupy the overlapped time-frequency resource.

The UE may identify the M1 PDCCH transmission candidates based on the preset rule by using only M2 (M2<M1) successfully monitored PDCCH transmission candidates.

The network side may notify the UE of the preset rule in advance through signaling transmission.

Optionally, if the network side does not notify the preset rule in advance, or the rule is not preset, the PDSCH may use a specific transmission manner. In this specific transmission manner, the PDSCH does not overlap with the PDCCH candidates for scheduling the PDSCH.

For example, repetition sending is performed on the PDCCH, and occupies different sending occasions. However, an association relationship between these sending occasions is not notified to the UE. If the UE successfully detects only one of the sending occasions, a location of another sending occasion cannot be learned, and it cannot learn whether the another sending occasion collides with the PDSCH. Therefore, to avoid this problem, when sending the PDCCH and the scheduled PDSCH, the network side may perform transmission while ensuring that there is no collision between the two.

Optionally, in this embodiment, in a case that one PDCCH transmission occasion collides with one PDSCH transmission occasion, and a TCI (Transmission Configuration Indicator) state activated by a CORESET associated with the PDCCH and a TCT state indicated by the PDSCH transmission occasion are not in a same group, the PDSCH may be transmitted on the time-frequency resource on which collision occurs.

For example, in this embodiment, a group configuration pre-indicates the PDSCH by using a higher-layer parameter.

For example, the UE communicates with two base stations or two TRPs. One PDCCH transmission occasion is sent on a first TRP, and one PDSCH transmission occasion is sent on a second TRP. A base station may notify one TCI state group, indicating that interference between transmit signals associated with different TCI states in the group may be ignored. When receiving the PDCCH, the UE may determine that interference from the PDSCH on the resource on which collision occurs may be ignored. When receiving the PDSCH, the UE may determine that PDCCH interference from the resource on which collision occurs may be ignored. Therefore, avoidance behavior is not required between the two, that is, the PDSCH may send a PDSCH signal on the time-frequency resource on which collision occurs.

Optionally, the preset rule is determined based on an association relationship between the successfully detected PDCCH transmission occasion and all the PDCCH transmission occasions on which collision occurs, and the association relationship is determined based on the related configuration information of the PDCCH.

For example, the preset rule may be obtained by the UE according to a related configuration of the PDCCH, and is specifically the association relationship between the successfully detected PDCCH transmission occasion and all the PDCCH transmission occasions on which collision occurs. Based on the association relationship, all the PDCCH transmission occasions on which collision occurs may be determined according to the successfully detected PDCCH transmission occasion.

Optionally, in a case that a PDSCH scheduled by the PDCCH is in a first mapping manner, before the transmitting a PDSCH based on related configuration information of the PDCCH, the method further includes:

scheduling the PDSCH in a case that a first start OFDM symbol of the PDCCH is not after a first start OFDM symbol of the PDSCH; or scheduling the PDSCH in a case that a first start OFDM symbol on a last transmission occasion occupied by the PDCCH in time domain is not after a first start OFDM symbol of the PDSCH; or scheduling the PDSCH in a case that a preset gap meets a reporting capability of UE.

For example, a PDSCH time domain resource allocation parameter PDSCH-TimeDomainResourceAllocation is carried in RRC signaling PDSCH-Config and PDSCH-Config- Common. There are mainly three parameters: k0, mappingType, and startSymbolAndLength, where k0 represents an offset slot between a slot in which current DCI is located and a slot in which an indicated PDSCH is located, an allocation type indicated by mappingType is typeA or typeB, and startSymbolAndLength indicates an SLIV value. From this value, a start OFDM symbol location S of the slot in which the PDSCH is located and several occupied continuous OFDM symbols L may be deduced.

Figure 3:
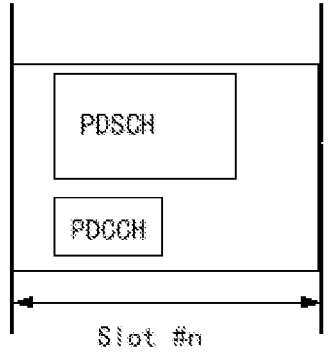
FIG. 3 is a first schematic diagram of arrangement of OFDM symbols of a PDCCH and a PDSCH according to an embodiment of this application.
Figure 4:
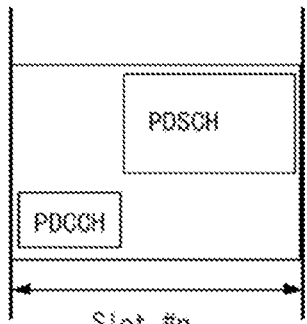
FIG. 4 is a second schematic diagram of arrangement of OFDM symbols of a PDCCH and a PDSCH according to an embodiment of this application.

For example, FIG. 3 is a first schematic diagram of arrangement of OFDM symbols of a PDCCH and a PDSCH according to an embodiment of this application. FIG. 4 is a second schematic diagram of arrangement of OFDM symbols of a PDCCH and a PDSCH according to an embodiment of this application. As shown in FIG. 3 and FIG. 4, in a case that it is determined, based on the related configuration information of the PDCCH, that the PDSCH scheduled by the PDCCH is in the first mapping manner, it needs to be ensured that at least the first start OFDM symbol of the PDCCH cannot be behind the first start OFDM symbol of the PDSCH.

Figure 5:
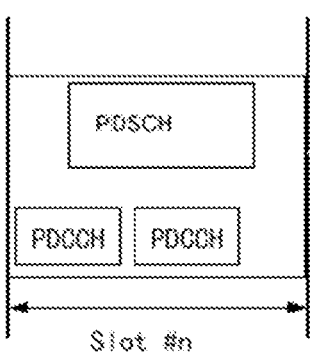
FIG. 5 is a third schematic diagram of arrangement of OFDM symbols of a PDCCH and a PDSCH according to an embodiment of this application.

FIG. 5 is a third schematic diagram of arrangement of OFDM symbols of a PDCCH and a PDSCH according to an embodiment of this application. When repetition is enhanced for the PDCCH in a TDM time division manner, as shown in FIG. 5, at least a first PDCCH repetition not being behind the first start OFDM symbol of the PDSCH may be ensured but this cannot be ensured for second PDCCH repetition and the scheduled PDSCH.

Therefore, in this embodiment, to successfully transmit the PDSCH, it may be specified that the PDCCH and the PDSCH may be transmitted and scheduled in a case that the first start OFDM symbol of the PDCCH is not behind the first start OFDM symbol of the PDSCH; or the PDCCH and the PDSCH may be transmitted and scheduled in a case that the first start OFDM symbol of the last transmission occasion occupied by the PDCCH in time domain is not behind the first start OFDM symbol of the PDSCH; or the PDCCH and the PDSCH may be transmitted and scheduled in a case that the preset gap meets the reporting capability of the UE.

In this embodiment, the first mapping manner may be a typeB mapping manner.

For example, when the PDSCH scheduled by the PDCCH is in a typeB mapping manner, the PDCCH may include M (M≥1) PDCCH candidates, and the PDSCH may include N (N≥1) PDSCH transmission occasions for transmitting a same TB block.

Therefore, it may be specified that the PDCCH and the PDSCH may be transmitted and scheduled in a case that at least the first start OFDM symbol of the PDCCH is not behind the first start OFDM symbol of the PDSCH.

Alternatively, it may be specified that the PDCCH and the PDSCH may be transmitted and scheduled in a case that at least the first start OFDM symbol of the last transmission occasion occupied by the PDCCH in time domain is not behind the first start OFDM symbol of the PDSCH.

Alternatively, when one PDSCH transmission occasion and two PDCCH transmission occasions may overlap in time, it may be specified that the PDCCH and the PDSCH may be transmitted and scheduled in a case that the preset gap meets the reporting capability of the UE.

Optionally, the preset gap is a gap between two PDCCH transmission occasions, or the preset gap is a gap between a PDSCH transmission occasion and a second PDCCH transmission occasion.

In some embodiments, the preset gap may be a gap between two PDCCH transmission occasions.

For example, the preset gap is a gap between a last OFDM symbol occupied by a first PDCCH transmission occasion and a first OFDM symbol occupied by a second PDCCH transmission occasion.

In some other embodiments, the preset gap may be a gap between the PDSCH transmission occasion and the second PDCCH transmission occasion.

For example, the preset gap is a gap between a first OFDM symbol occupied by the PDSCH transmission occasion and a first OFDM symbol occupied by the second PDCCH transmission occasion.

Optionally, in a case that any front-loaded DMRS in a PDSCH transmission occasion included in a PDSCH scheduled by the PDCCH collides with any CORESET, before the transmitting a PDSCH based on related configuration information of the PDCCH, the method further includes:

shifting the front-loaded DMRS backward until the front-loaded DMRS does not collide with any CORESET; or in a case that a CORESET pool index configured for the CORESET that collides with the front-loaded DMRS is different from a CORESET pool index of a CORESET associated with a PDCCH for scheduling a PDSCH transmission occasion of the front-loaded DMRS, not shifting the front-loaded DMRS backward; or in a case that a TCI state activated by the CORESET that collides with the front-loaded DMRS and a TCI state activated by a CORESET associated with a PDCCH for scheduling a PDSCH transmission occasion of the front-loaded DMRS are not in a same group, or in a case that a TCI state activated by the CORESET that collides with the front-loaded DMRS and a TCI state indicated by a PDSCH transmission occasion for scheduling the front-loaded DMRS are not in a same group, not shifting the front-loaded DMRS backward; otherwise, shifting the front-loaded DMRS backward until the front-loaded DMRS does not collide with any CORESET.

Generally, if the front-loaded DMRS configured for the PDSCH collides with any CORESET configured for the UE, to successfully transmit the PDSCH, the front-loaded DMRS symbol may be shifted backward until the front-loaded DMRS no longer collides with any CORESET.

In this embodiment, if a TCI state (TCI state) associated with the front-loaded DMRS and a TCI state associated with the CORESET are not in a QCL relationship, or mutual interference between the two is very small, the front-loaded DMRS may be shifted or not shifted.

For example, the front-loaded DMRS may be directly shifted backward until the front-loaded DMRS does not collide with any CORESET.

Alternatively, in a case that the CORESET pool index configured for the CORESET that collides with the front-loaded DMRS is different from the CORESET pool index of the CORESET associated with the PDCCH for scheduling the PDSCH transmission occasion of the front-loaded DMRS, the front-loaded DMRS may not be shifted backward.

Alternatively, in a case that the TCI state activated by the CORESET that collides with the front-loaded DMRS and the TCI state activated by the CORESET associated with the PDCCH for scheduling the PDSCH transmission occasion of the front-loaded DMRS are not in a same group, or in a case that the TCI state activated by the CORESET that collides with the front-loaded DMRS and the TCI state indicated by the PDSCH transmission occasion for scheduling the front-loaded DMRS are not in a same group, the front-loaded DMRS may not be shifted backward; otherwise, the front-loaded DMRS may be shifted backward until the front-loaded DMRS does not collide with any CORESET.

For example, when a PDCCH schedules transmission of a PDSCH, the PDSCH may consist of N (N>=1) PDSCH transmission occasions for transmitting a same TB block. If a front-loaded DMRS in some PDSCH transmission occasions collides with a configured CORESET, the front-loaded DMRS may be shifted backward until no collision occurs with the CORESET.

Alternatively, in a case that the CORESET pool index configured for the CORESET that collides with the front-loaded DMRS is different from the CORESET pool index of the CORESET associated with the PDCCH for scheduling the PDSCH transmission occasion of the front-loaded DMRS, the front-loaded DMRS may not be shifted backward.

Alternatively, in a case that the TCI state activated by the CORESET that collides with the front-loaded DMRS and the TCI state activated by the CORESET associated with the PDCCH for scheduling the PDSCH transmission occasion of the front-loaded DMRS or the TCI state indicated by the PDSCH transmission occasion of the front-loaded DMRS are not in a same group, the front-loaded DMRS is not shifted backward. Otherwise, the front-loaded DMRS may be shifted backward until no collision occurs with the CORESET.

Optionally, after the shifting the front-loaded DMRS backward, the method further includes:

shifting an additional DMRS corresponding to the front-loaded DMRS backward, where a same gap is maintained between the front-loaded DMRS and the corresponding additional DMRS.

For example, when the front-loaded DMRS is shifted backward, the corresponding additional DMRS, that is, additional loaded DMRS, may be shifted synchronously. When the front-loaded DMRS is shifted, a gap between the front-loaded DMRS and the corresponding additional DMRS remains unchanged.

Optionally, after the shifting an additional DMRS corresponding to the front-loaded DMRS backward, the method further includes:

in a case that the additional DMRS collides with the CORESET, shifting the additional DMRS corresponding to the front-loaded DMRS backward until no collision occurs with any CORESET.

For example, in a case that a gap between the front-loaded DMRS and the corresponding additional DMRS remains unchanged, when the front-loaded DMRS is shifted until no collision occurs with any CORESET, the additional DMRS shifted synchronously may collide with the CORESET. Therefore, the additional DMRS may continue to be shifted until no collision occurs with any CORESET. In this process, the front-loaded DMRS may no longer shift.

Optionally, after the shifting an additional DMRS corresponding to the front-loaded DMRS backward, the method further includes:

discarding the additional DMRS in a case that the additional DMRS is shifted beyond a configured time domain symbol of the PDSCH.

For example, in a case that a gap between the front-loaded DMRS and the corresponding additional DMRS remains unchanged, when the front-loaded DMRS is shifted until no collision occurs with any CORESET, the additional DMRS shifted synchronously may be shifted beyond a configured time domain symbol of the PDSCH, so that the additional DMRS beyond the configured time domain symbol of the PDSCH can be directly discarded.

In this embodiment of this application, in a case that transmission of a physical downlink control channel PDCCH occupies one or more transmission occasions for repetition sending, a transmission location of a PDSCH is determined by using different methods based on different related configuration information of the PDCCH, and then the PDSCH is scheduled and transmitted, to better adapt to a case that reliability transmission is enhanced for the PDCCH, thereby ensuring successful scheduling and transmission of the PDSCH.

It should be noted that the PDSCH transmission method provided in the embodiments of this application may be performed by a PDSCH transmission apparatus, or a control module that is in the PDSCH transmission apparatus and that is configured to perform the PDSCH transmission method. In the embodiments of this application, that the PDSCH transmission apparatus performs the PDSCH transmission method is used as an example to describe the PDSCH transmission apparatus provided in the embodiments of this application.

Figure 6:
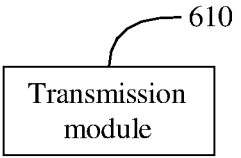
FIG. 6 is a schematic structural diagram of a PDSCH transmission apparatus according to an embodiment of this application.

FIG. 6 is a schematic structural diagram of a PDSCH transmission apparatus according to an embodiment of this application. As shown in FIG. 6, the apparatus includes a transmission module 610.

The transmission module 610 is configured to: in a case that transmission of a physical downlink control channel PDCCH occupies one or more transmission occasions for repetition sending, transmit a PDSCH based on related configuration information of the PDCCH.

Optionally, in a case that transmission of the PDCCH occupies the one or more transmission occasions for repetition sending, the PDSCH transmission apparatus transmits the physical downlink shared channel PDSCH based on the related configuration information of the PDCCH by using the transmission module 610.

In this embodiment of this application, in a case that transmission of a physical downlink control channel PDCCH occupies one or more transmission occasions for repetition sending, a transmission location of a PDSCH is determined by using different methods based on different related configuration information of the PDCCH, and then the PDSCH is scheduled and transmitted, to better adapt to a case that reliability transmission is enhanced for the PDCCH, thereby ensuring successful scheduling and transmission of the PDSCH.

Optionally, the apparatus further includes:

a first determining module, configured to: in a case that the PDCCH is configured to be associated with control resource sets CORESETs of a plurality of different CORESET IDS, determine that a resource block RB start index of the PDSCH is associated with a location of a lowest RB in a specified CORESET in the different CORESETs; or a second determining module, configured to: in a case that the PDCCH is configured to be associated with only a CORESET of one CORESET ID, determine that an RB start index of the PDSCH is associated with a location of a lowest RB in the CORESET of the one CORESET ID, where the PDSCH is scheduled by a downlink control information DCI format of any common search space type.

Optionally, in a case that the PDCCH collides with a time-frequency resource of a PDSCH scheduled by the PDCCH, the apparatus further includes:

a first transmission module, configured to transmit the PDSCH without occupying the time-frequency resource on which collision occurs, where the time-frequency resource is a time-frequency resource of all PDCCH transmission occasions on which collision occurs, and all the PDCCH transmission occasions on which collision occurs are determined by UE based on a preset rule and according to a PDCCH transmission occasion successfully detected by the UE; or a second transmission module, configured to: in a case that one PDCCH transmission occasion collides with one PDSCH transmission occasion, and a TCI state activated by a CORESET associated with the PDCCH and a TCT state indicated by the PDSCH transmission occasion are not in a same group, transmit the PDSCH on the time-frequency resource on which collision occurs.

Optionally, the preset rule is determined based on an association relationship between the successfully detected PDCCH transmission occasion and all the PDCCH transmission occasions on which collision occurs, and the association relationship is determined based on the related configuration information of the PDCCH.

Optionally, in a case that a PDSCH scheduled by the PDCCH is in a first mapping manner, the apparatus further includes:

a first scheduling module, configured to schedule the PDSCH in a case that a first start OFDM symbol of the PDCCH is not after a first start OFDM symbol of the PDSCH; or a second scheduling module, configured to schedule the PDSCH in a case that a first start OFDM symbol on a last transmission occasion occupied by the PDCCH in time domain is not after a first start OFDM symbol of the PDSCH; or a third scheduling module, configured to schedule the PDSCH in a case that a preset gap meets a reporting capability of UE.

Optionally, the preset gap is a gap between two PDCCH transmission occasions, or the preset gap is a gap between a PDSCH transmission occasion and a second PDCCH transmission occasion.

Optionally, in a case that any front-loaded DMRS in a PDSCH transmission occasion included in a PDSCH scheduled by the PDCCH collides with any CORESET, the apparatus further includes:

a first shifting module, configured to shift the front-loaded DMRS backward until the front-loaded DMRS does not collide with any CORESET; or a second shifting module, configured to: in a case that a CORESET pool index configured for the CORESET that collides with the front-loaded DMRS is different from a CORESET pool index of a CORESET associated with a PDCCH for scheduling a PDSCH transmission occasion of the front-loaded DMRS, not shift the front-loaded DMRS backward; or a third shifting module, configured to: in a case that a TCI state activated by the CORESET that collides with the front-loaded DMRS and a TCI state activated by a CORESET associated with a PDCCH for scheduling a PDSCH transmission occasion of the front-loaded DMRS are not in a same group, or in a case that a TCI state activated by the CORESET that collides with the front-loaded DMRS and a TCI state indicated by a PDSCH transmission occasion for scheduling the front-loaded DMRS are not in a same group, not shift the front-loaded DMRS backward; otherwise, shift the front-loaded DMRS backward until the front-loaded DMRS does not collide with any CORESET.

Optionally, the apparatus further includes:

a fourth shifting module, configured to: after the front-loaded DMRS is shifted backward, shift an additional DMRS corresponding to the front-loaded DMRS backward, where a same gap is maintained between the front-loaded DMRS and the corresponding additional DMRS.

Optionally, the apparatus further includes:

a fifth shifting module, configured to: after the additional DMRS corresponding to the front-loaded DMRS is shifted backward, in a case that the additional DMRS collides with the CORESET, shift the additional DMRS corresponding to the front-loaded DMRS backward until no collision occurs with any CORESET.

Optionally, the apparatus further includes:

a discarding module, configured to: after the additional DMRS corresponding to the front-loaded DMRS is shifted backward, discard the additional DMRS in a case that the additional DMRS is shifted beyond a configured time domain symbol of the PDSCH.

In this embodiment of this application, in a case that transmission of a physical downlink control channel PDCCH occupies one or more transmission occasions for repetition sending, a transmission location of a PDSCH is determined by using different methods based on different related configuration information of the PDCCH, and then the PDSCH is scheduled and transmitted, to better adapt to a case that reliability transmission is enhanced for the PDCCH, thereby ensuring successful scheduling and transmission of the PDSCH.

The PDSCH transmission apparatus in this embodiment of this application may be an apparatus, or may be a component, an integrated circuit, or a chip in a terminal. The apparatus may be a mobile terminal, or may be a non-mobile terminal. For example, the mobile device may include but is not limited to the types of the foregoing listed terminal 11, and the non-mobile terminal may be a server, a network attached storage (NAS), a personal computer (PC), a television (TV), an automated teller machine, or a self-service machine. This is not specifically limited in the embodiments of this application.

The PDSCH transmission apparatus in this embodiment of this application may be an apparatus with an operating system. The operating system may be an Android operating system, an iOS operating system, or another possible operating system. This is not specifically limited in the embodiments of this application.

The PDSCH transmission apparatus provided in this embodiment of this application can implement the processes implemented in the method embodiments in FIG. 2 to FIG. 5, and achieve a same technical effect. To avoid repetition, details are not described herein again.

Figure 7:
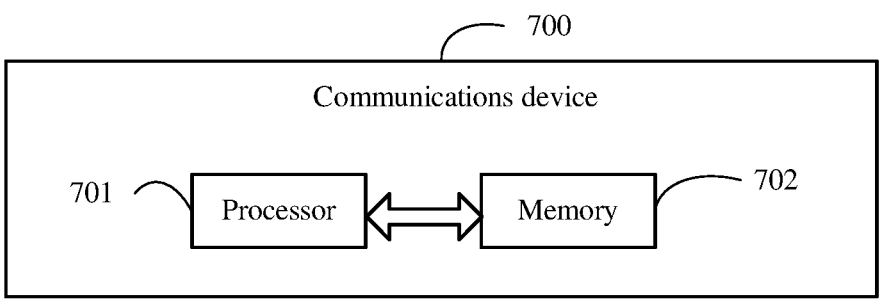
FIG. 7 is a schematic structural diagram of a communications device according to an embodiment of this application.

Optionally, FIG. 7 is a schematic structural diagram of a communications device according to an embodiment of this application. As shown in FIG. 7, the communications device 700 includes a processor 701, a memory 702, a program or an instruction that is stored in the memory 702 and executable on the processor 701. For example, when the communications device 700 is a terminal, the program or the instruction is executed by the processor 701 to implement the processes of the foregoing PDSCH transmission method embodiment, and a same technical effect can be achieved. When the communications device 700 is a network side device, the program or the instruction is executed by the processor 701 to implement the processes of the foregoing PUSCH transmission method embodiment, and a same technical effect can be achieved. To avoid repetition, details are not described herein again.

Figure 8:
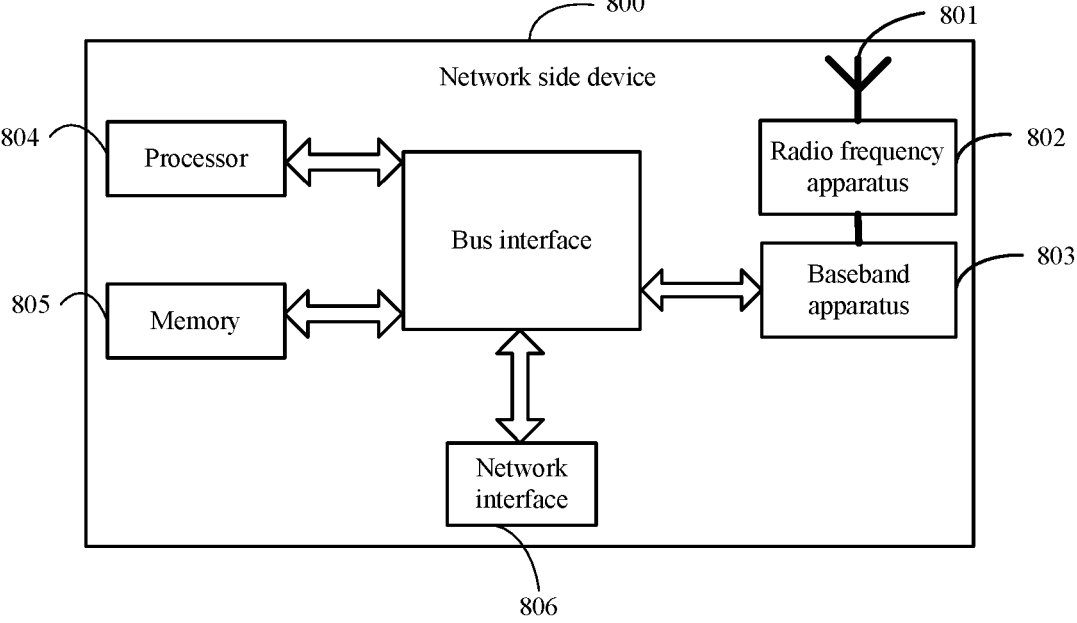
FIG. 8 is a schematic structural diagram of hardware of a network side device according to an embodiment of this application.

FIG. 8 is a schematic structural diagram of hardware of a network side device according to an embodiment of this application.

As shown in FIG. 8, a network side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes to-be-sent information, and sends the information to the radio frequency apparatus 802. The radio frequency apparatus 802 processes the received information and then sends the information by using the antenna 801.

The frequency band processing apparatus may be located in the baseband apparatus 803. The method performed by the network side device in the foregoing embodiment may be implemented in the baseband apparatus 803. The baseband apparatus 803 includes a processor 804 and a memory 805.

The baseband apparatus 803 may include, for example, at least one baseband board, where a plurality of chips are disposed on the baseband board. As shown in FIG. 8, one chip is, for example, the processor 804, which is connected to the memory 805, so as to invoke a program in the memory 805 to perform operations of the network device shown in the foregoing method embodiment.

The baseband apparatus 803 may further include a network interface 806, configured to exchange information with the radio frequency apparatus 802. For example, the interface is a common public radio interface (CPRI).

Optionally, the network side device in this embodiment of this application further includes an instruction or a program that is stored in the memory 805 and executable on the processor 804. The processor 804 invokes the instruction or the program in the memory 805 to perform the method performed by the modules shown in FIG. 6, and a same technical effect is achieved. To avoid repetition, details are not described herein again.

Figure 9:
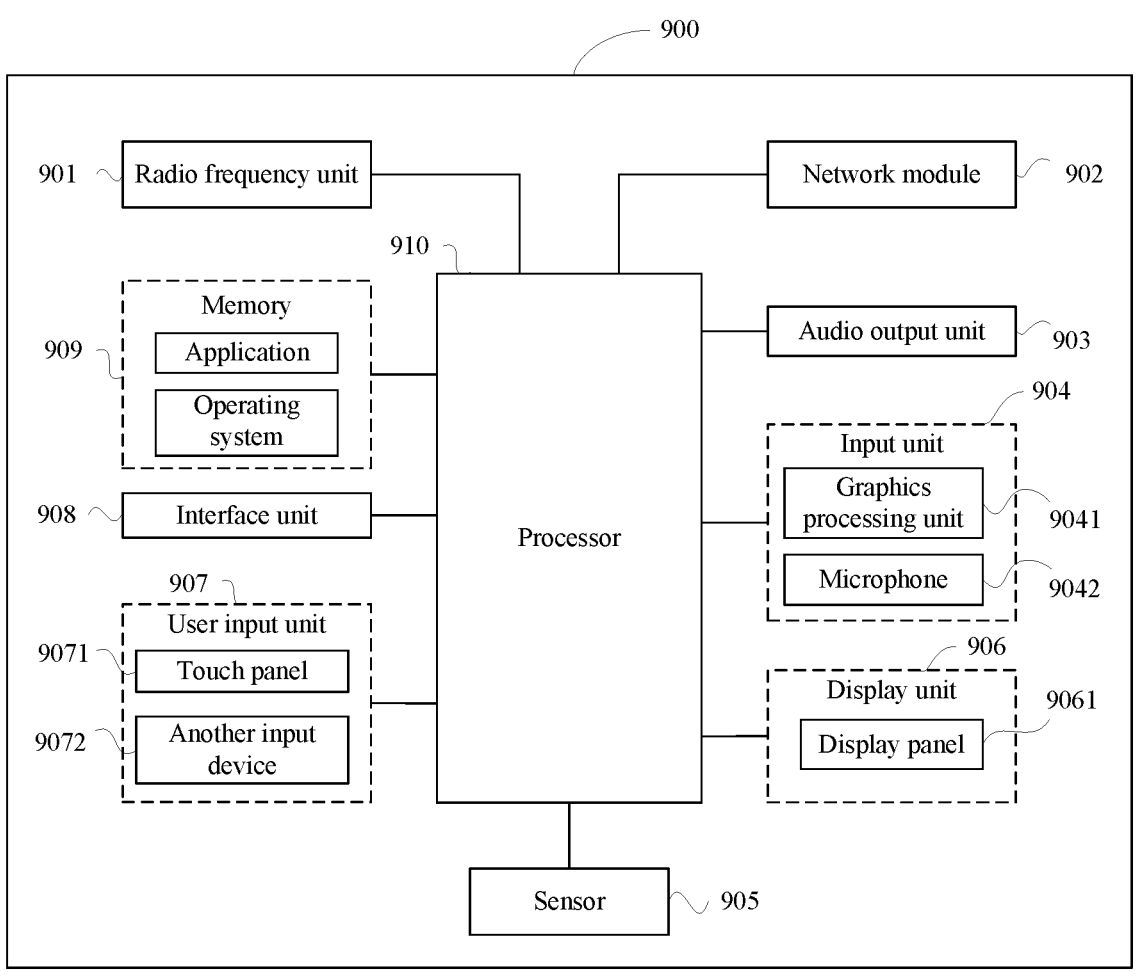
FIG. 9 is a schematic structural diagram of hardware of a terminal according to an embodiment of this application.

FIG. 9 is a schematic structural diagram of hardware of a terminal according to an embodiment of this application.

A terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art can understand that the terminal 900 may further include a power supply (such as a battery) that supplies power to each component. The power supply may be logically connected to the processor 910 by using a power supply management system, to implement functions such as charging and discharging management, and power consumption management by using the power supply management system. The terminal structure shown in FIG. 9 constitutes no limitation on the terminal, and the terminal may include more or fewer components than those shown in the figure, or combine some components, or have different component arrangements. Details are not described herein.

It should be understood that, in this embodiment of this application, the input unit 904 may include a graphics processing unit (GPU) 9041 and a microphone 9042, and the graphics processing unit 9041 processes image data of a still picture or a video obtained by an image capture apparatus (such as a camera) in a video capture mode or an image capture mode. The display unit 906 may include a display panel 9061. Optionally, the display panel 9061 may be configured in a form such as a liquid crystal display or an organic light-emitting diode. The user input unit 907 may include a touch panel 9071 and another input device 9072, and the touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein.

In this embodiment of this application, the radio frequency unit 901 receives downlink data from a network side device and then sends the downlink data to the processor 910 for processing; and sends uplink data to the network side device. Usually, the radio frequency unit 901 includes but is not limited to an antenna, at least one amplifier, a transceiver, a coupler, a low noise amplifier, a duplexer, and the like.

The memory 909 may be configured to store a software program or an instruction and various data. The memory 909 may mainly include a program or instruction storage area and a data storage area. The program or instruction storage area may store an operating system, and an application or an instruction required by at least one function (for example, a sound playing function or an image playing function). In addition, the memory 909 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 910 may include one or more processing units. Optionally, an application processor and a modem processor may be integrated into the processor 910. The application processor mainly processes an operating system, a user interface, an application, an instruction, or the like. The modem processor mainly processes wireless communications, for example, a baseband processor. It can be understood that, alternatively, the modem processor may not be integrated into the processor 910.

The processor 910 is configured to: in a case that transmission of a physical downlink control channel PDCCH occupies one or more transmission occasions for repetition sending, transmit a PDSCH based on related configuration information of the PDCCH.

In this embodiment of this application, in a case that transmission of a physical downlink control channel PDCCH occupies one or more transmission occasions for repetition sending, a transmission location of a PDSCH is determined by using different methods based on different related configuration information of the PDCCH, and then the PDSCH is scheduled and transmitted, to better adapt to a case that reliability transmission is enhanced for the PDCCH, thereby ensuring successful scheduling and transmission of the PDSCH.

Optionally, the processor is further configured to:

in a case that the PDCCH is configured to be associated with control resource sets CORESETs of a plurality of different CORESET IDs, determine that a resource block RB start index of the PDSCH is associated with a location of a lowest RB in a specified CORESET in the different CORESETs; or in a case that the PDCCH is configured to be associated with only a CORESET of one CORESET ID, determine that an RB start index of the PDSCH is associated with a location of a lowest RB in the CORESET of the one CORESET ID, where the PDSCH is scheduled by a downlink control information DCI format of any common search space type.

Optionally, the processor is further configured to: in a case that the PDCCH collides with a time-frequency resource of a PDSCH scheduled by the PDCCH, transmit the PDSCH without occupying the time-frequency resource on which collision occurs, where the time-frequency resource is a time-frequency resource of all PDCCH transmission occasions on which collision occurs, and all the PDCCH transmission occasions on which collision occurs are determined by UE based on a preset rule and according to a PDCCH transmission occasion successfully detected by the UE; or in a case that one PDCCH transmission occasion collides with one PDSCH transmission occasion, and a TCI state activated by a CORESET associated with the PDCCH and a TCT state indicated by the PDSCH transmission occasion are not in a same group, transmit the PDSCH on the time-frequency resource on which collision occurs.

Optionally, the preset rule is determined based on an association relationship between the successfully detected PDCCH transmission occasion and all the PDCCH transmission occasions on which collision occurs, and the association relationship is determined based on the related configuration information of the PDCCH.

Optionally, the processor is further configured to: in a case that a PDSCH scheduled by the PDCCH is in a first mapping manner, schedule the PDSCH in a case that a first start OFDM symbol of the PDCCH is not after a first start OFDM symbol of the PDSCH; or schedule the PDSCH in a case that a first start OFDM symbol on a last transmission occasion occupied by the PDCCH in time domain is not after a first start OFDM symbol of the PDSCH; or scheduling the PDSCH in a case that a preset gap meets a reporting capability of UE.

Optionally, the preset gap is a gap between two PDCCH transmission occasions, or the preset gap is a gap between a PDSCH transmission occasion and a second PDCCH transmission occasion.

Optionally, the processor is further configured to: in a case that any front-loaded DMRS in a PDSCH transmission occasion included in a PDSCH scheduled by the PDCCH collides with any CORESET, shift the front-loaded DMRS backward until the front-loaded DMRS does not collide with any CORESET; or in a case that a CORESET pool index configured for the CORESET that collides with the front-loaded DMRS is different from a CORESET pool index of a CORESET associated with a PDCCH for scheduling a PDSCH transmission occasion of the front-loaded DMRS, not shift the front-loaded DMRS backward; or in a case that a TCI state activated by the CORESET that collides with the front-loaded DMRS and a TCI state activated by a CORESET associated with a PDCCH for scheduling a PDSCH transmission occasion of the front-loaded DMRS are not in a same group, or in a case that a TCI state activated by the CORESET that collides with the front-loaded DMRS and a TCI state indicated by a PDSCH transmission occasion for scheduling the front-loaded DMRS are not in a same group, not shift the front-loaded DMRS backward; otherwise, shift the front-loaded DMRS backward until the front-loaded DMRS does not collide with any CORESET.

Optionally, the processor is further configured to: after the front-loaded DMRS is shifted backward, shift an additional DMRS corresponding to the front-loaded DMRS backward, where a same gap is maintained between the front-loaded DMRS and the corresponding additional DMRS.

Optionally, the processor is further configured to: after the additional DMRS corresponding to the front-loaded DMRS is shifted backward, in a case that the additional DMRS collides with the CORESET, shift the additional DMRS corresponding to the front-loaded DMRS backward until no collision occurs with any CORESET.

Optionally, the processor is further configured to: after the additional DMRS corresponding to the front-loaded DMRS is shifted backward, discard the additional DMRS in a case that the additional DMRS is shifted beyond a configured time domain symbol of the PDSCH.

In this embodiment of this application, in a case that transmission of a physical downlink control channel PDCCH occupies one or more transmission occasions for repetition sending, a transmission location of a PDSCH is determined by using different methods based on different related configuration information of the PDCCH, and then the PDSCH is scheduled and transmitted, to better adapt to a case that reliability transmission is enhanced for the PDCCH, thereby ensuring successful scheduling and transmission of the PDSCH.

An embodiment of this application further provides a non-transitory readable storage medium. The non-transitory readable storage medium stores a program or an instruction, and when the program or the instruction is executed by a processor, the processes of the foregoing PDSCH transmission method embodiment are implemented and a same technical effect can be achieved. To avoid repetition, details are not described herein again.

The processor is a processor in the terminal in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction of a network side device to implement the processes of the foregoing PDSCH transmission method embodiment and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A physical downlink shared channel (PDSCH) transmission method, applied to a communications device and comprising:

in a case that a physical downlink control channel (PDCCH) occupies multiple transmission occasions and is configured to be associated with control resource sets (CORESETs) of a plurality of different CORESET identifiers (IDs), determining that a resource block (RB) start index of a PDSCH is associated with a location of a lowest RB in a specified CORESET in different CORESETs, wherein the specified CORESET is the one with smallest CORESET ID in a plurality of CORESETs associated with the PDCCH;

in a case that transmission of the PDCCH occupies the multiple transmission occasions, transmitting the PDSCH based on related configuration information of the PDCCH;

wherein in a case that a PDSCH scheduled by the PDCCH is in a first mapping manner, before the transmitting the PDSCH based on related configuration information of the PDCCH, the method further comprises: scheduling the PDSCH in a case that a first start orthogonal frequency division multiplexing (OFDM) symbol on a last transmission occasion among the multiple transmission occasions occupied by the PDCCH in time domain is not after a first start OFDM symbol of the PDSCH.

2. The PDSCH transmission method according to claim 1, wherein the PDSCH is scheduled by a downlink control information (DCI) format of any common search space type.

3. The PDSCH transmission method according to claim 1, wherein in a case that the PDCCH collides with a time-frequency resource of a PDSCH scheduled by the PDCCH, before the transmitting the PDSCH based on related configuration information of the PDCCH, the method further comprises:

transmitting the PDSCH without occupying the time-frequency resource on which collision occurs, wherein the time-frequency resource is a time-frequency resource of all PDCCH transmission occasions on which collision occurs, and, based on a preset rule, all the PDCCH transmission occasions on which collision occurs are determined by user equipment (UE) according to a PDCCH transmission occasion successfully detected by the UE.

4. The PDSCH transmission method according to claim 3, wherein the preset rule is determined based on an association relationship between the successfully detected PDCCH transmission occasion and all the PDCCH transmission occasions on which collision occurs, and the association relationship is determined based on the related configuration information of the PDCCH.

5. The PDSCH transmission method according to claim 1, wherein in a case that any front-loaded demodulation reference signal (DMRS) in a PDSCH transmission occasion comprised in a PDSCH scheduled by the PDCCH collides with any CORESET, before the transmitting the PDSCH based on related configuration information of the PDCCH, the method further comprises:

shifting the front-loaded DMRS backward until the front-loaded DMRS does not collide with any CORESET; or in a case that a CORESET pool index configured for the CORESET that collides with the front-loaded DMRS is different from a CORESET pool index of a CORESET associated with a PDCCH for scheduling a PDSCH transmission occasion of the front-loaded DMRS, not shifting the front-loaded DMRS backward; or in a case that a TCI state activated by the CORESET that collides with the front-loaded DMRS and a TCI state activated by a CORESET associated with a PDCCH for scheduling a PDSCH transmission occasion of the front-loaded DMRS are not in a same group, or in a case that a TCI state activated by the CORESET that collides with the front-loaded DMRS and a TCI state indicated by a PDSCH transmission occasion of the front-loaded DMRS are not in a same group, not shifting the front-loaded DMRS backward; otherwise, shifting the front-loaded DMRS backward until the front-loaded DMRS does not collide with any CORE-SET.

6. The PDSCH transmission method according to claim 5, wherein after the shifting the front-loaded DMRS backward, the method further comprises:

shifting an additional DMRS corresponding to the front-loaded DMRS backward, wherein a same gap is maintained between the front-loaded DMRS and the corresponding additional DMRS.

7. The PDSCH transmission method according to claim 6, wherein after the shifting an additional DMRS corresponding to the front-loaded DMRS backward, the method further comprises:

in a case that the additional DMRS collides with the CORESET, shifting the additional DMRS corresponding to the front-loaded DMRS backward until no collision occurs with any CORESET; or discarding the additional DMRS in a case that the additional DMRS is shifted beyond a configured time domain symbol of the PDSCH.

8. A non-transitory readable storage medium, wherein the non-transitory readable storage medium stores a program or an instruction, and the program or the instruction is executed by a processor to implement the steps of the PDSCH transmission method according to claim 2.

9. A non-transitory readable storage medium, wherein the non-transitory readable storage medium stores a program or an instruction, and the program or the instruction is executed by a processor to implement the steps of the PDSCH transmission method according to claim 3.

10. A communications device, comprising a processor, a memory, and a program or an instruction that is stored in the memory and executable on the processor, wherein the program or the instruction, when executed by the processor, causes the communications device to perform:

in a case that a physical downlink control channel (PDCCH) occupies multiple transmission occasions and is configured to be associated with control resource sets (CORESETs) of a plurality of different CORESET identifiers (IDs), determining that a resource block (RB) start index of a physical downlink shared channel (PDSCH) is associated with a location of a lowest RB in a specified CORESET in different CORESETs, wherein the specified CORESET is the one with smallest CORESET ID in a plurality of CORESETs associated with the PDCCH;

in a case that transmission of the PDCCH occupies the multiple transmission occasions, transmitting the PDSCH based on related configuration information of the PDCCH;

wherein a PDSCH scheduled by the PDCCH is in a first mapping manner, and the program or the instruction, when executed by the processor, causes the communications device to further perform: scheduling the PDSCH in a case that a first start orthogonal frequency division multiplexing (OFDM) symbol on a last transmission occasion among the multiple transmission occasions occupied by the PDCCH in time domain is not after a first start OFDM symbol of the PDSCH.

11. The communications device according to claim 10, wherein the PDSCH is scheduled by a downlink control information (DCI) format of any common search space type.

12. The communications device according to claim 10, wherein the PDCCH collides with a time-frequency resource of a PDSCH scheduled by the PDCCH; and the program or the instruction, when executed by the processor, causes the communications device to further perform:

transmitting the PDSCH without occupying the time-frequency resource on which collision occurs, wherein the time-frequency resource is a time-frequency resource of all PDCCH transmission occasions on which collision occurs, and all the PDCCH transmission occasions on which collision occurs are determined by user equipment (UE) based on a preset rule and according to a PDCCH transmission occasion successfully detected by the UE.

13. The communications device according to claim 12, wherein the preset rule is determined based on an association relationship between the successfully detected PDCCH transmission occasion and all the PDCCH transmission occasions on which collision occurs, and the association relationship is determined based on the related configuration information of the PDCCH.

14. The communications device according to claim 10, wherein any front-loaded demodulation reference signal (DMRS) in a PDSCH transmission occasion comprised in a PDSCH scheduled by the PDCCH collides with any CORE-SET; and the program or the instruction, when executed by the processor, causes the communications device to further perform:

shifting the front-loaded DMRS backward until the front-loaded DMRS does not collide with any CORESET; or in a case that a CORESET pool index configured for the CORESET that collides with the front-loaded DMRS is different from a CORESET pool index of a CORESET associated with a PDCCH for scheduling a PDSCH transmission occasion of the front-loaded DMRS, not shifting the front-loaded DMRS backward; or in a case that a TCI state activated by the CORESET that collides with the front-loaded DMRS and a TCI state activated by a CORESET associated with a PDCCH for scheduling a PDSCH transmission occasion of the front-loaded DMRS are not in a same group, or in a case that a TCI state activated by the CORESET that collides with the front-loaded DMRS and a TCI state indicated by a PDSCH transmission occasion for scheduling the front-loaded DMRS are not in a same group, not shifting the front-loaded DMRS backward; otherwise, shifting the front-loaded DMRS backward until the front-loaded DMRS does not collide with any CORESET.

15. The communications device according to claim 14, wherein the program or the instruction, when executed by the processor, causes the communications device to further perform:

after the front-loaded DMRS is shifted backward, shifting an additional DMRS corresponding to the front-loaded DMRS backward, wherein a same gap is maintained between the front-loaded DMRS and the corresponding additional DMRS.

16. A non-transitory readable storage medium, wherein the non-transitory readable storage medium stores a program or an instruction, and the program or the instruction is executed by a processor to implement the steps of the PDSCH transmission method according to claim 1.

17. A chip, wherein the chip comprises a processor and a communications interface, the communications interface is coupled to the processor, and the processor is configured to run a program or an instruction to implement the steps of the PDSCH transmission method according to claim 1.

18. A computer program product, wherein the computer program product is stored in a non-volatile storage medium, and the computer program product is executed by at least one processor to implement the steps of the PDSCH transmission method according to claim 1.

19. The communications device according to claim 15, wherein the program or the instruction, when executed by the processor, causes the communications device to further perform:

after the additional DMRS corresponding to the front-loaded DMRS is shifted backward, in a case that the additional DMRS collides with the CORESET, shifting the additional DMRS corresponding to the front-loaded DMRS backward until no collision occurs with any CORESET.

20. The communications device according to claim 19, wherein the program or the instruction, when executed by the processor, causes the communications device to further perform:

after the additional DMRS corresponding to the front-loaded DMRS is shifted backward, discarding the additional DMRS in a case that the additional DMRS is shifted beyond a configured time domain symbol of the PDSCH.

* * * * *